US012761848B2

(12) United States Patent
Chen et al.

(10) Patent No.: US 12,761,848 B2
(45) Date of Patent: Oct. 13, 2026

(54) PROJECTOR SYSTEM AND METHOD FOR OPERATING PROJECTOR SYSTEM

(71) Applicant: Coretronic Corporation, Hsin-Chu (TW)

(72) Inventors: Yu-Meng Chen, Hsin-Chu (TW); Chih-Jen Yeh, Hsin-Chu (TW); Ssu-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 216 days.

(21) Appl. No.: 18/607,518

(22) Filed: Mar. 17, 2024

(65) Prior Publication Data

US 2024/0319944 A1 Sep. 26, 2024

(30) Foreign Application Priority Data

Mar. 21, 2023 (CN) ........................ 202310275082.X
Jul. 10, 2023 (CN) ........................ 202310835388.6

(51) Int. Cl.
*G06F 3/14* (2006.01)
*G06F 3/0482* (2013.01)
*G06F 3/0484* (2022.01)
*G06F 9/4401* (2018.01)
(Continued)

(52) U.S. Cl.
CPC .............. *G06F 3/14* (2013.01); *G06F 3/0482* (2013.01); *G06F 3/0484* (2013.01); *G06F 9/4411* (2013.01); *G06F 9/452* (2018.02); *H04N 9/3147* (2013.01)

(58) Field of Classification Search
None
See application file for complete search history.

(56) References Cited

U.S. PATENT DOCUMENTS 7,949,708 B2 * 5/2011 Wang ...................... G06F 15/16 713/324
2010/0077079 A1 * 3/2010 Xu ...................... G06F 11/2294 709/226

(Continued)

FOREIGN PATENT DOCUMENTS

| | | |
|---|---|---|
| CN | 213024391 | 4/2021 |
| TW | 201713121 | 4/2017 |
| TW | 201717596 | 5/2017 |

*Primary Examiner* — Paul Yen
(74) *Attorney, Agent, or Firm* — JCIPRNET

(57) ABSTRACT

A projection system including a projection device, an adapter device and an electronic device is provided. The projection device is adapted to be connected to the adapter device. The adapter device is connected to the electronic device. The adapter device is configured to receive a control command output by the electronic device and transmit the control command to the corresponding projection device. The projection device includes a first control circuit and a second control circuit. The first control circuit is configured to perform a booting operation on the projection device according to the control command during a powered-off state of the projection device. The second control circuit is configured to perform a power-off operation or a running operation on the projection device according to the control command during a booted-up state of the projection device. An operation method of the projection system is also provided.

36 Claims, 12 Drawing Sheets

(51) Int. Cl.
*G06F 9/451* (2018.01)
*H04N 9/31* (2006.01)

(56) References Cited

U.S. PATENT DOCUMENTS

| | | | | |
|---|---|---|---|---|
| 2015/0081103 | A1* | 3/2015 | Song | H04W 4/80<br>700/275 |
| 2020/0310731 | A1* | 10/2020 | Yang | G06F 3/14 |
| 2022/0179746 | A1* | 6/2022 | Lin | G06F 11/3692 |

* cited by examiner

PROJECTOR SYSTEM AND METHOD FOR OPERATING PROJECTOR SYSTEM

CROSS-REFERENCE TO RELATED APPLICATION

This application claims the priority benefit of Chinese application no. 202310275082.X, filed on Mar. 21, 2023 and Chinese application no. 202310835388.6, filed on Jul. 10, 2023. The entirety of the above-mentioned patent applications is hereby incorporated by reference herein and made a part of this specification.

BACKGROUND

Technical Field

The invention relates to an electronic system and an operation method of the electronic system. In particular, the invention relates to a projection system and an operation method of the projection system.

Description of Related Art

Generally, an infrared (IR) remote controller is designed to remotely control a projector wirelessly. At present, a conventional remote controller is prone to aging, damage, or loss, making it unlikely to remotely control the projector. The IR remote controller needs to use batteries for power supply, while batteries are not environmentally friendly and may cause environmental pollution. A projector equipped with a conventional remote controller cannot be added with operating functions and other after-sales services through online software updates. Further, the conventional remote controller has directivity issues, and during operation, needs to be directed at the projector for controlling. Even without directivity issues, the conventional remote controller may not be able to control the projector if it is not within a certain range.

In addition, in the existing projector, a main control chip cannot recognize a Bluetooth dongle with a universal serial bus (USB). As a result, it is also unlikely to design a USB jack, in which the Bluetooth dongle may be inserted, for remote Bluetooth connection to remotely control the projector.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a projection system and an operation method of the projection system, which may solve the above-mentioned conventional technical issues.

Other purposes and advantages of the invention may be further understood from the technical features disclosed in the invention.

To achieve one, some, or all of the above purposes or other purposes, the invention provides a projection system including a projection device, an adapter device and an electronic device. The projection device is adapted to be connected to the adapter device. The adapter device is connected to the electronic device. The adapter device is configured to receive a control command output by the electronic device and transmit the control command to the corresponding projection device. The projection device includes a first control circuit and a second control circuit. The first control circuit is configured to perform a booting operation on the projection device according to the control command in a powered-off state of the projection device. The second control circuit is configured to perform a power-off operation or a running operation on the projection device according to the control command in a booted-up state of the projection device.

To achieve one, some, or all of the above purposes or other purposes, the invention provides an operation method of a projection system. The projection system includes a projection device, an adapter device and an electronic device. The projection device includes a first control circuit and a second control circuit. The operation method includes the following. By the adapter device, a control command output by the electronic device is received, and a communication protocol of the control command is converted from a first communication protocol into a second communication protocol, and the control command is transmitted to the corresponding projection device. A booting operation is performed on the projection device by the first control circuit according to the control command in a powered-off state. A power-off operation or a running operation is performed on the projection device by the second control circuit according to the control command in a booted-up state.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The above-mentioned and other technical contents, features, and effects of the invention will be clearly presented in the following detailed description of one of the preferred embodiments with reference to the drawings. The directional terms, such as up, down, left, right, front, back, or the like, mentioned in the following embodiments are only referring to the directions of the drawings. Accordingly, the directional terms are used for illustration and not for limitation of the invention.

Figure 1:
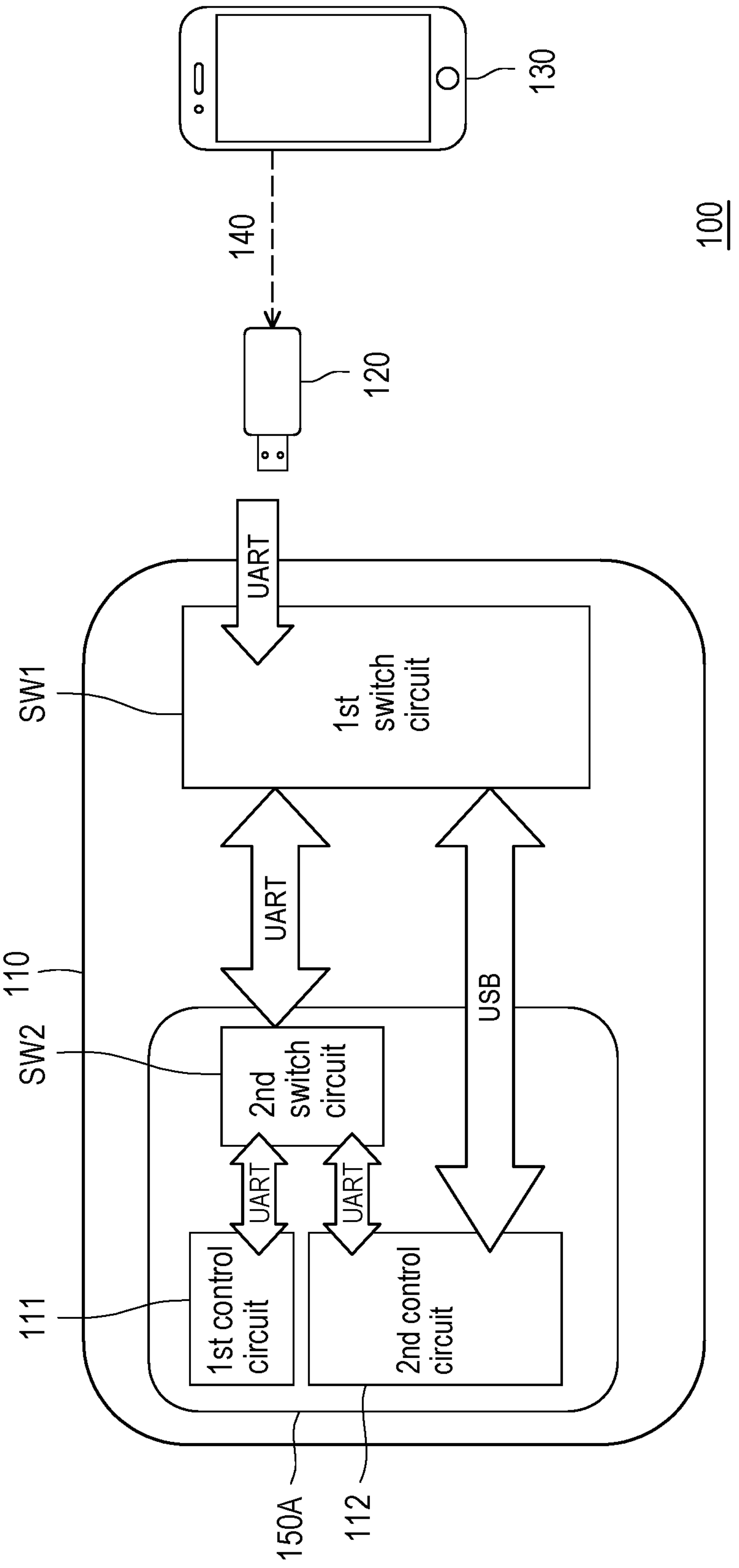
FIG. 1 is a schematic diagram of a projection system of an embodiment of the invention.

FIG. 1 is a schematic diagram of a projection system of an embodiment of the invention. With reference to FIG. 1, in this embodiment, a projection system 100 includes a projection device 110, an adapter device 120, and an electronic device 130. The projection device 110 is adapted to be connected to the adapter device 120. The adapter device 120 is connected to the electronic device 130. The adapter device 120 is configured to receive a control command 140 output by the electronic device 130. The adapter device 120 is configured to convert a communication protocol of the control command 140 from a first communication protocol into a second communication protocol, and transmit the control command 140 to the corresponding projection device. For example, the electronic device 130 and the adapter device 120 use the serial port profile (SPP) as the communication protocol between them, and the projection device 110 and the adapter device 120 use a hardware communication protocol conforming to the universal asynchronous receiver transmitter (UART) as the communication protocol between them. The adapter device 120 may convert the communication protocol of the control command 140 from the SPP protocol into the UART protocol, and transmit the control command 140 to the corresponding projection device 110. Nonetheless, the invention does not limit the communication protocols between the elements. As a result, the electronic device 130 may utilize the control command 140 to control the projection device 110 to perform a booting operation, a power-off operation, or a running operation.

In this embodiment, the projection device 110 is projection equipment such as a projector, the adapter device 120 is a wireless communication receiver such as a Bluetooth dongle, and the electronic device 130 is a portable mobile device such as a mobile phone or a tablet computer. Nonetheless, the invention does not limit the types of the adapter device 120 and the electronic device 130.

The projection device 110 includes a first control circuit 111, a second control circuit 112, a first switch circuit SW1, and a second switch circuit SW2. The first switch circuit SW1 is connected to the adapter device 120. The second switch circuit SW2 is connected between the first switch circuit SW1 and the first control circuit 111, and the second switch circuit SW2 is connected between the first switch circuit SW1 and the second control circuit 112.

In a powered-off state of the projection device 110, the first control circuit 111 performs a booting operation on the projection device 110 according to the control command 140. In a booted-up state of the projection device 110, the second control circuit 112 performs a power-off operation or a running operation on the projection device 110 according to the control command 140. For example, the running operation may include adjusting the brightness and darkness of the projected image or controlling the projection lens to be displaced along a direction, but the invention does not limit the relevant commands included in the running operation.

Specifically, the first switch circuit SW1 is configured to receive the control command 140 conforming to the second communication protocol (e.g., the UART protocol) from the adapter device 120, and output the control command 140 to the second switch circuit SW2. The second switch circuit SW2 is configured to receive the control command 140 conforming to the second communication protocol from the first switch circuit SW1, and output the control command 140 to the first control circuit 111 or the second control circuit 112.

In the powered-off state of the projection device 110, the second switch circuit SW2 may switch to the port communicating with the first control circuit 111. The electronic device 130 utilizes the first communication protocol (e.g., the SPP protocol) to send the control command 140 to the adapter device 120. The control command 140 may be a booting command or other control commands. The adapter device 120 converts the control command 140 into a control command conforming to the second communication protocol, and transmits the control command 140 to the UART port of the first control circuit 111 through the first switch circuit SW1. As a result, the second switch circuit SW2 may output the control command 140 to the first control circuit 111 in the powered-off state, such that the first control circuit 111 performs a booting operation on the projection device 110 according to the control command 140. For example, the first control circuit 111 is a microcontroller unit (MCU), but the invention does not limit the type of the first control circuit 111.

Next, the first control circuit 111 follows the second communication protocol and parses the control command 140 to perform corresponding actions and replies. The path for the first control circuit 111 to reply or transmit commands is utilizing its UART port to output a signal, transmitting the signal first through the second switch circuit SW2 and then through the first switch circuit SW1 to the adapter device 120. The signal includes a reply from the first control circuit 111 or a command to be transmitted. After receiving the signal, the adapter device 120 converts the communication protocol of the signal from the second communication protocol into the first communication protocol. The adapter device 120 transmits the signal back to the electronic device 130 via the first communication protocol.

In the booted-up state of the projection device 110, the second switch circuit SW2 may switch to the port communicating with the second control circuit 112. The electronic device 130 similarly utilizes the first communication protocol to send the control command 140 to the adapter device 120. The control command 140 may be a power-off command or other control commands. The adapter device 120 converts the control command 140 into a control command conforming to the second communication protocol, and transmits the control command 140 to the UART port of the second control circuit 112 through the first switch circuit SW1. As a result, the second switch circuit SW2 may output the control command 140 to the second control circuit 112 in the booted-up state, such that the second control circuit 112 performs a power-off operation or a running operation on the projection device 110 according to the control command 140. For example, the second control circuit 112 is a main control integrated circuit (IC) controlling the projection device 110 to perform a power-off operation or an overall running operation, but the invention does not limit the type of the second control circuit 112.

Next, the second control circuit 112 follows the second communication protocol and parses the control command 140 to perform corresponding actions and replies. The path for the second control circuit 112 to reply or transmit commands is utilizing its UART port to output a signal, transmitting the signal first through the second switch circuit SW2 and then through the first switch circuit SW1 to the adapter device 120. The signal includes a reply from the second control circuit 112 or a command to be transmitted. After receiving the signal, the adapter device 120 converts the communication protocol of the signal from the second communication protocol into the first communication protocol. The adapter device 120 transmits the signal back to the electronic device 130 via the first communication protocol.

Figure 2:
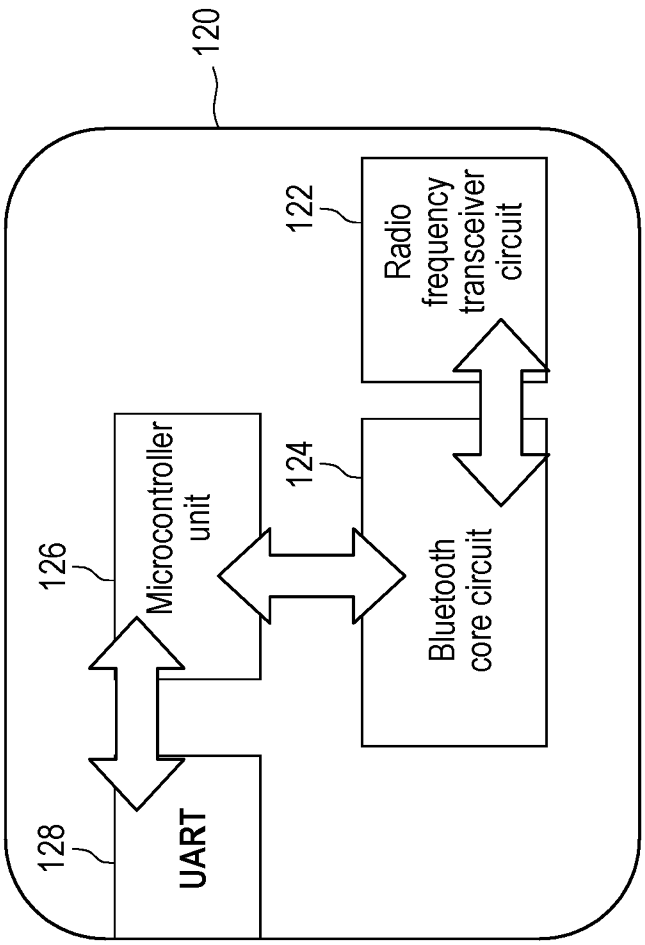
FIG. 2 is a schematic block diagram of the adapter device in the embodiment of FIG. 1.

FIG. 2 is a schematic block diagram of the adapter device in the embodiment of FIG. 1. With reference to FIG. 1 and FIG. 2, taking a Bluetooth dongle as an example, the adapter device 120 includes a radio frequency transceiver circuit 122, a Bluetooth core circuit 124, a microcontroller unit 126, and a UART 128. The Bluetooth core circuit 124 receives the control command 140 through the radio frequency transceiver circuit 122 (RF) from the electronic device 130, and then transmits the control command 140 to the microcontroller unit 126. The communication protocol of the control command 140 is converted by the microcontroller unit 126. Next, the control command 140 is transmitted to the projection device 110 from the UART 128.

Figure 3:
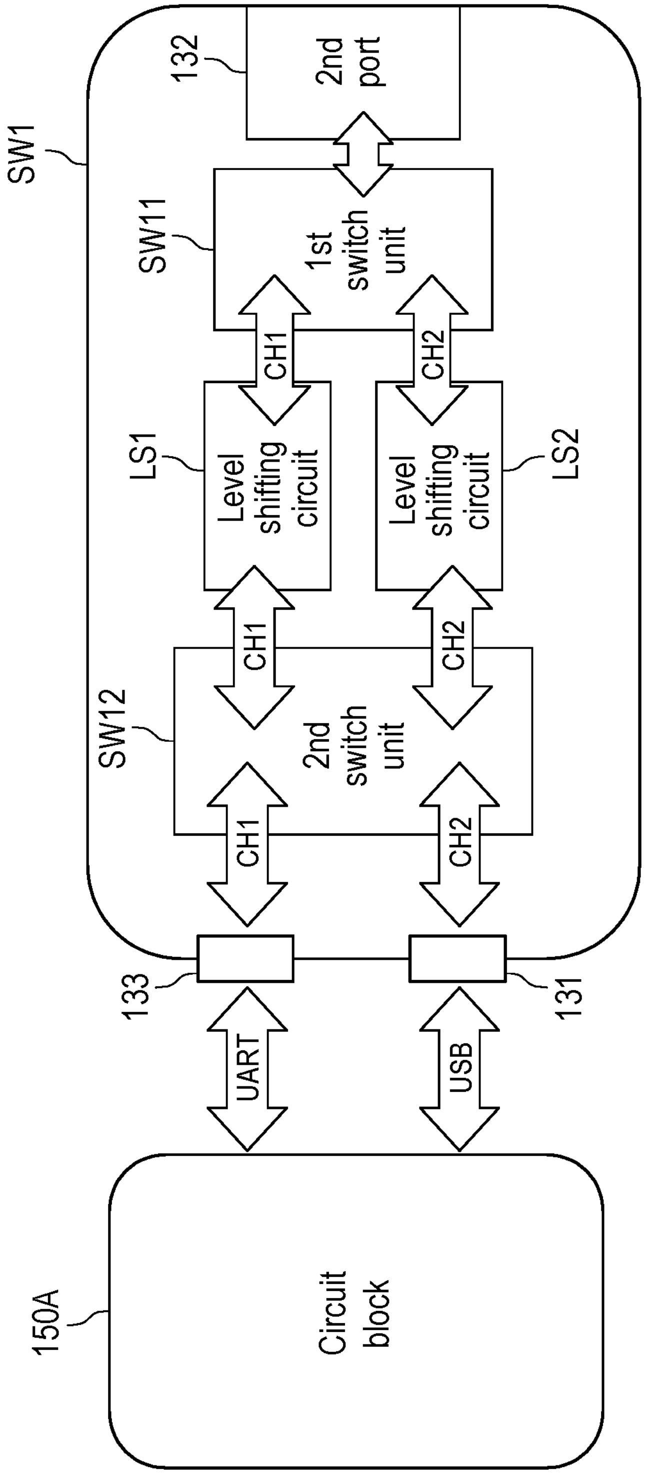
FIG. 3 is a schematic block diagram of the first switch circuit in the embodiment of FIG. 1.

FIG. 3 is a schematic block diagram of the first switch circuit in the embodiment of FIG. 1. With reference to FIG. 1 and FIG. 3, the first switch circuit SW1 includes a first port 131, a second port 132, and a third port 133. For example, the first port 131 and the second port 132 are each a USB, and the third port 133 is a UART. The first switch circuit SW1 is connected to the second control circuit 112 through the first port 131. The first switch circuit SW1 is connected to the first control circuit 111 through the third port 133. The first switch circuit SW1 may be connected to a host system (not shown) through the second port 132, such that the host system may perform an updating operation on the second control circuit 112. For example, the host system is a desktop computer or a notebook computer, but the invention does not limit the type of the host system.

In addition, the first switch circuit SW1 includes a first switch unit SW11, a second switch unit SW12, and level shifting circuits LS1 and LS2. When the projection device does not need to perform an updating operation, the first switch circuit SW1 may be connected to the adapter device 120 through the second port 132, such that the projection device 110 may receive, from the adapter device 120, the control command 140 from the electronic device 130. At this time, the first switch unit SW11 and the second switch unit SW12 switch to a first channel CH1, such that the control command 140 may be transmitted to the second switch circuit SW2 in a circuit block 150A.

When the projection device needs to perform an updating operation, the first switch circuit SW1 may be connected to the host system through the second port 132, and the first switch circuit SW1 is connected to the USB of the second control circuit 112 through the first port 131. At this time, the first switch unit SW11 and the second switch unit SW12 switch to a second channel CH2, such that the host system may perform an updating operation on the second control circuit 112, for example, update the software of the second control circuit 112.

Figure 4:
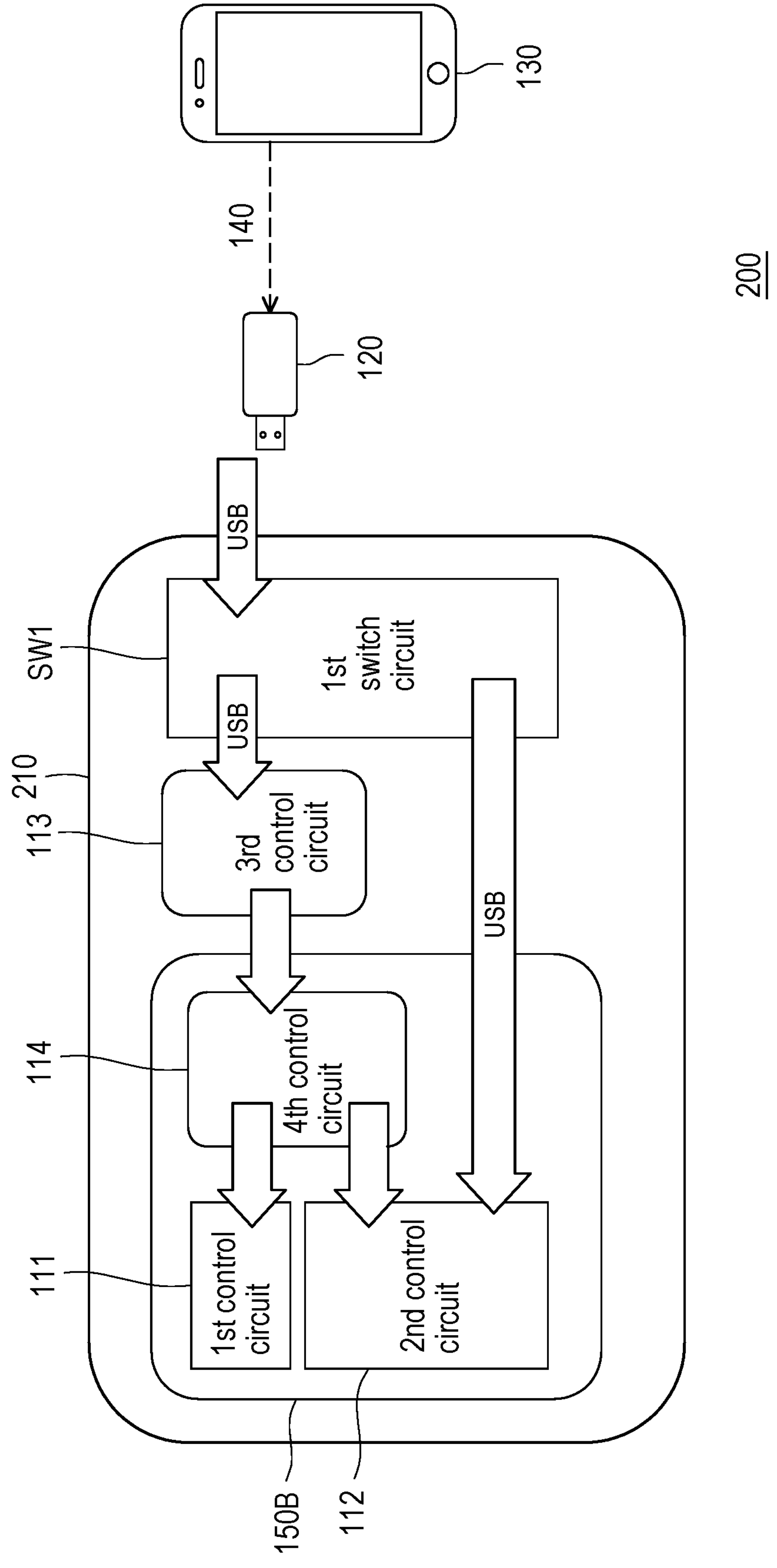
FIG. 4 is a schematic diagram of a projection system of an embodiment of the invention.

FIG. 4 is a schematic diagram of a projection system of an embodiment of the invention. With reference to FIG. 4, in this embodiment, the projection system 100 includes a projection device 210, an adapter device 120, and an electronic device 130. The projection device 210 is adapted to be connected to the adapter device 120. The adapter device 120 is connected to the electronic device 130. The adapter device 120 is configured to receive the control command 140 output by the electronic device 130. The adapter device 120 is configured to convert a communication protocol of the control command 140 from a first communication protocol into a second communication protocol. For example, the electronic device 130 and the adapter device 120 use the SPP as the communication protocol between them, and the projection device 210 and the adapter device 120 use a USB-compliant communication protocol (e.g., communication device class, CDC) as the communication protocol between them. The adapter device 120 may convert the communication protocol of the control command 140 from the SPP protocol into the CDC protocol. Nonetheless, the invention does not limit the communication protocols between the elements. As a result, the electronic device 130 may utilize the control command 140 to control the projection device 210 to perform a booting operation, a power-off operation, or a running operation.

In this embodiment, for example, the adapter device 120 is a wireless communication receiver such as a Bluetooth dongle, and the electronic device 130 is a portable mobile device such as a mobile phone or a tablet computer. Nonetheless, the invention does not limit the types of the adapter device 120 and the electronic device 130.

The projection device 210 includes a first control circuit 111, a second control circuit 112, a first switch circuit SW1, a third control circuit 113, and a fourth control circuit 114. The first switch circuit SW1 is connected to the adapter device 120. The third control circuit 113 is connected to the first switch circuit SW1. The fourth control circuit 114 is connected between the third control circuit 113 and the first control circuit 111, and the fourth control circuit 114 is connected between the third control circuit 113 and the second control circuit 112. For example, the third control circuit 113 is an MCU, but the invention does not limit the type of the third control circuit 113.

In a powered-off state of the projection device 210, the first control circuit 111 performs a booting operation on the projection device 210 according to the control command 140. In a booted-up state of the projection device 210, the second control circuit 112 performs a power-off operation or a running operation on the projection device 210 according to the control command 140.

Specifically, the first switch circuit SW1 is configured to receive the control command 140 conforming to the second communication protocol (e.g., the CDC protocol) from the adapter device 120, and output the control command 140 to the third control circuit 113. The third control circuit 113 is configured to receive the control command 140 conforming to the second communication protocol from the first switch circuit SW1, and convert the control command 140 conforming to the second communication protocol into a control signal 140 conforming to a third communication protocol. The fourth control circuit 114 is configured to receive the control command 140 conforming to the third communication protocol from the third control circuit 113, and output the control command 140 to the first control circuit 111 or the second control circuit 112. In this embodiment, the third communication protocol includes but is not limited to a communication protocol conforming to the UART, GPIO, I2C, and SPI interfaces.

In the powered-off state of the projection device 210, the fourth control circuit 114 may switch to the port communicating with the first control circuit 111. The electronic device 130 utilizes the first communication protocol (e.g., the SPP protocol) to send the control command 140 to the adapter device 120. The control command 140 may be a booting command or other control commands. The adapter device 120 converts the control command 140 into a control command conforming to the second communication protocol, and transmits the control command 140 to the first control circuit 111 through the first switch circuit SW1, the third control circuit 113, and the fourth control circuit 114. As a result, the fourth control circuit 114 may output the control command 140 to the first control circuit 111 in the powered-off state, such that the first control circuit 111 performs a booting operation on the projection device 210 according to the control command 140.

Next, the first control circuit 111 follows the third communication protocol and parses the control command 140 to perform corresponding actions and replies. The path for the first control circuit 111 to reply or transmit commands is utilizing its output port to output a signal, transmitting the signal sequentially through the fourth control circuit 114, the third control circuit 113, and the first switch circuit SW1 to the adapter device 120. The signal includes a reply from the first control circuit 111 or a command to be transmitted. After receiving the signal, the adapter device 120 converts the communication protocol of the signal from the second communication protocol into the first communication protocol. The adapter device 120 transmits the signal back to the electronic device 130 via the first communication protocol.

In the booted-up state of the projection device 210, the fourth control circuit 114 may switch to the port communicating with the second control circuit 112. The electronic device 130 similarly utilizes the first communication protocol to send the control command 140 to the adapter device 120. The control command 140 may be a power-off command or other control commands. The adapter device 120 converts the control command 140 into a control command conforming to the second communication protocol, and transmits the control command 140 to the second control circuit 112 through the first switch circuit SW1, the third control circuit 113, and the fourth control circuit 114. As a result, the fourth control circuit 114 may output the control command 140 to the second control circuit 112 in the booted-up state, such that the second control circuit 112 performs a power-off operation or a running operation on the projection device 210 according to the control command 140. For example, the running operation may include adjusting the brightness and darkness of the projected image or controlling the projection lens to be displaced along a direction, but the invention does not limit the relevant commands included in the running operation.

Next, the second control circuit 112 follows the third communication protocol and parses the control command 140 to perform corresponding actions and replies. The path for the second control circuit 112 to reply or transmit commands is utilizing its output port to output a signal, transmitting the signal sequentially through the fourth control circuit 114, the third control circuit 113, and the first switch circuit SW1 to the adapter device 120. The signal includes a reply from the second control circuit 112 or a command to be transmitted. After receiving the signal, the adapter device 120 converts the communication protocol of the signal from the second communication protocol into the first communication protocol. The adapter device 120 transmits the signal back to the electronic device 130 via the first communication protocol.

In this embodiment, the third communication protocol includes but is not limited to a communication protocol conforming to the UART, GPIO, I2C, and SPI interfaces.

FIG. 5, FIG. 6, FIG. 7, and FIG. 8 are respectively schematic diagrams of transmission between control circuits through different interfaces, where a circuit block 150B includes a first control circuit 111, a second control circuit 112, and a fourth control circuit 114.

Figure 5:
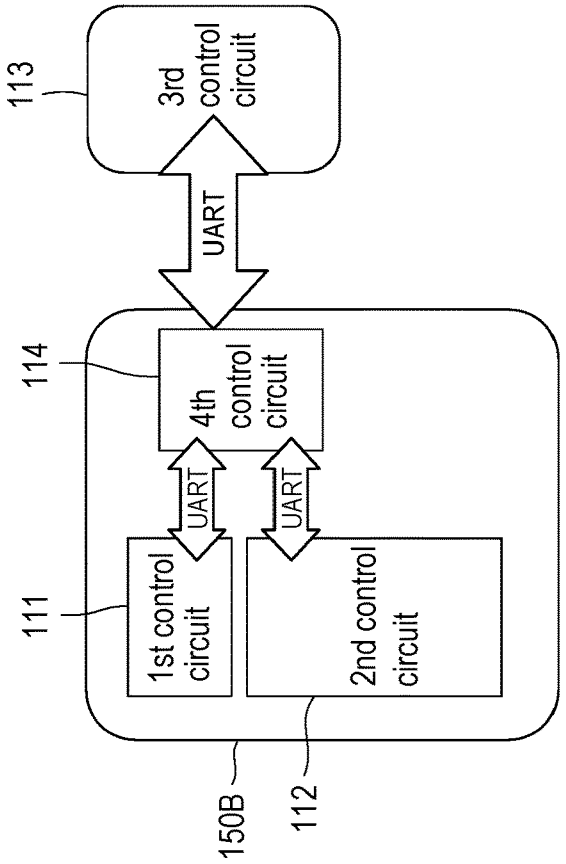

In FIG. 5, signal transmission between the control circuits is performed through the UART interface. As a result, the third control circuit 113 converts the signal from the CDC protocol (the second communication protocol) into the UART protocol (the third communication protocol). In this embodiment, the fourth control circuit 114 is a switch circuit for switching signal transmission paths.

Figure 6:
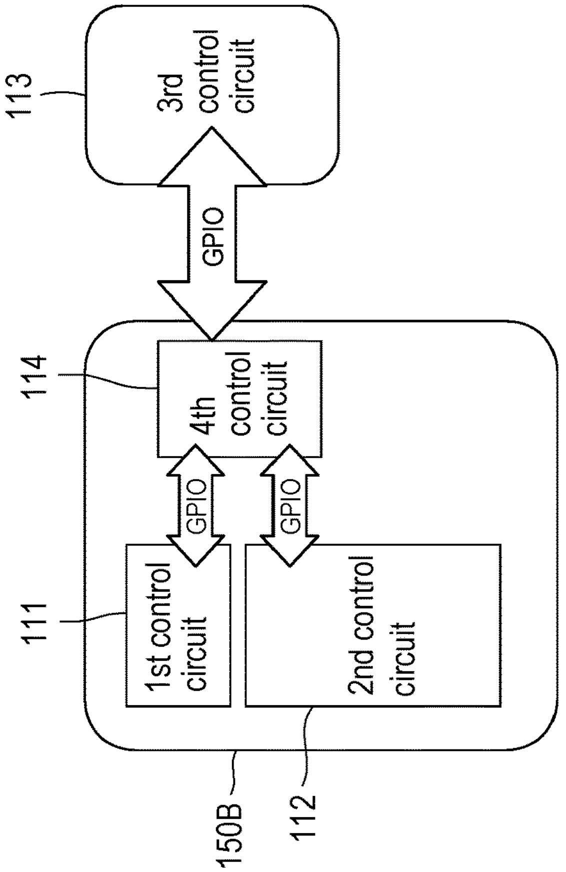
FIG. 5, FIG. 6, FIG. 7, and FIG. 8 are respectively schematic diagrams of transmission between control circuits through different interfaces.

In FIG. 6, signal transmission between the control circuits is performed through the GPIO interface. As a result, the third control circuit 113 converts the signal from the CDC protocol (the second communication protocol) into a communication protocol (the third communication protocol) conforming to the GPIO interface. In this embodiment, the fourth control circuit 114 is similarly a switch circuit for switching signal transmission paths.

Figure 7:
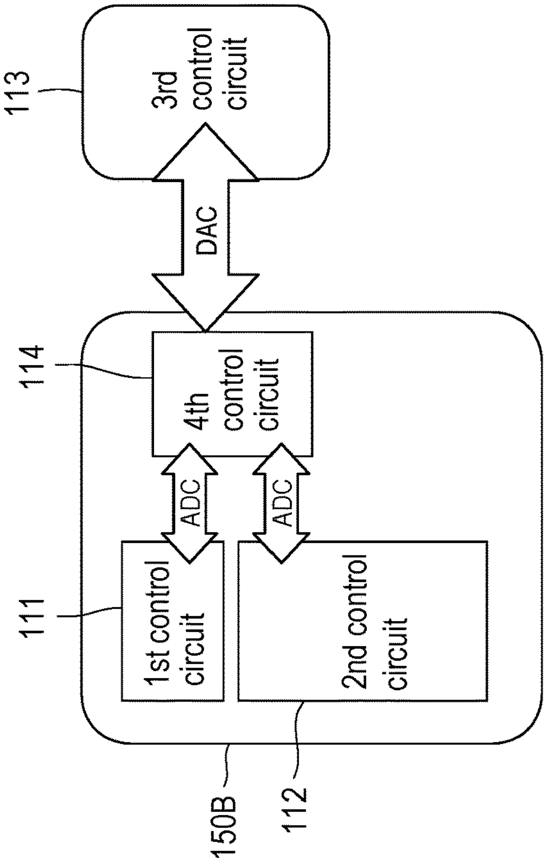

In FIG. 7, the fourth control circuit 114 is an analog switch circuit. Digital-level signal transmission and control between the control circuits are performed by utilizing analog-to-digital conversion (ADC) and digital-to-analog conversion (DAC).

Figure 8:
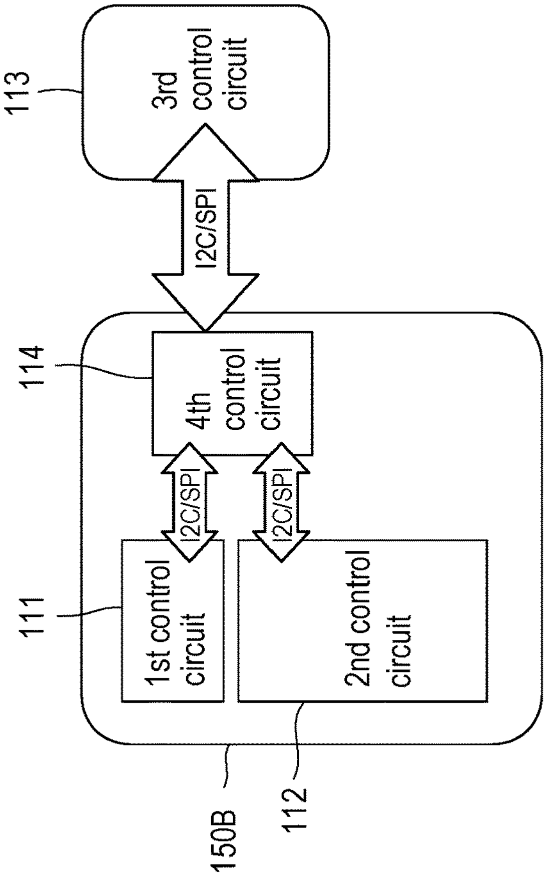

In FIG. 8, signal transmission between the control circuits is performed through the I2C or SPI interface. As a result, the third control circuit 113 converts the signal from the CDC protocol (the second communication protocol) into a communication protocol (the third communication protocol) conforming to the I2C or SPI interface. In this embodiment, the fourth control circuit 114 is a switch circuit for switching signal transmission paths.

Figure 9:
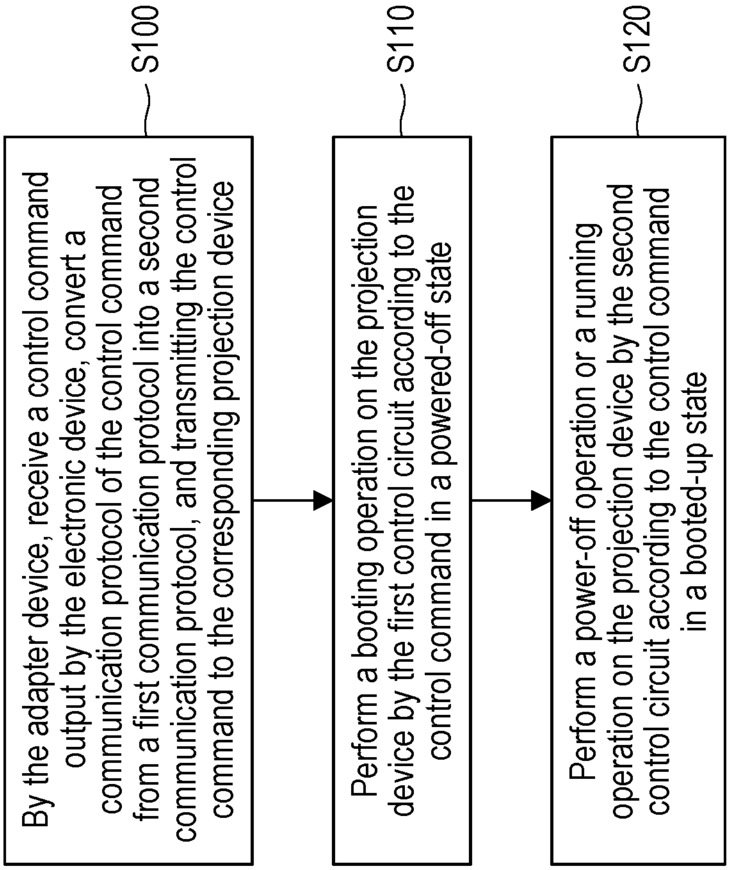
FIG. 9 is a flowchart of an operation method of a projection system of an embodiment of the invention.

FIG. 9 is a flowchart of an operation method of a projection system of an embodiment of the invention. With reference to FIG. 1 and FIG. 9, in this embodiment, the operation method of a projection system is applicable to at least the projection system 100 of FIG. 1, which is not limited by the invention. Taking the projection system 100 of FIG. 1 as an example, in step S100, by the adapter device 120, the control command 140 output by the electronic device 130 is received and a communication protocol of the control command 140 is converted from a first communication protocol into a second communication protocol, and the control command 140 is transmitted to the corresponding projection device 110. In step S110, a booting operation is performed on the projection device 110 by the first control circuit 111 according to the control command 140 in a powered-off state. In step S120, a power-off operation or a running operation is performed on the projection device 110 by the second control circuit 112 according to the control command 140 in a booted-up state.

In addition, sufficient teachings, suggestions, and implementation instructions about the operation method of a projection system of the embodiment of the invention may be obtained from the descriptions of the embodiments of FIG. 1 to FIG. 8, which will thus not be repeatedly described.

Figure 10:
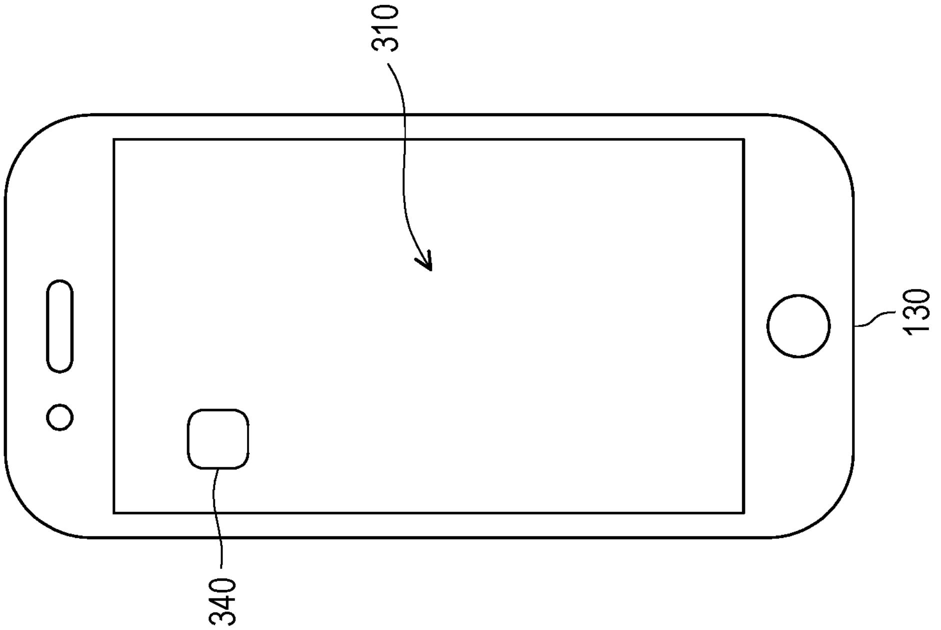
FIG. 10 is a schematic diagram of an electronic device including a display interface according to an embodiment of the invention.
Figure 11:
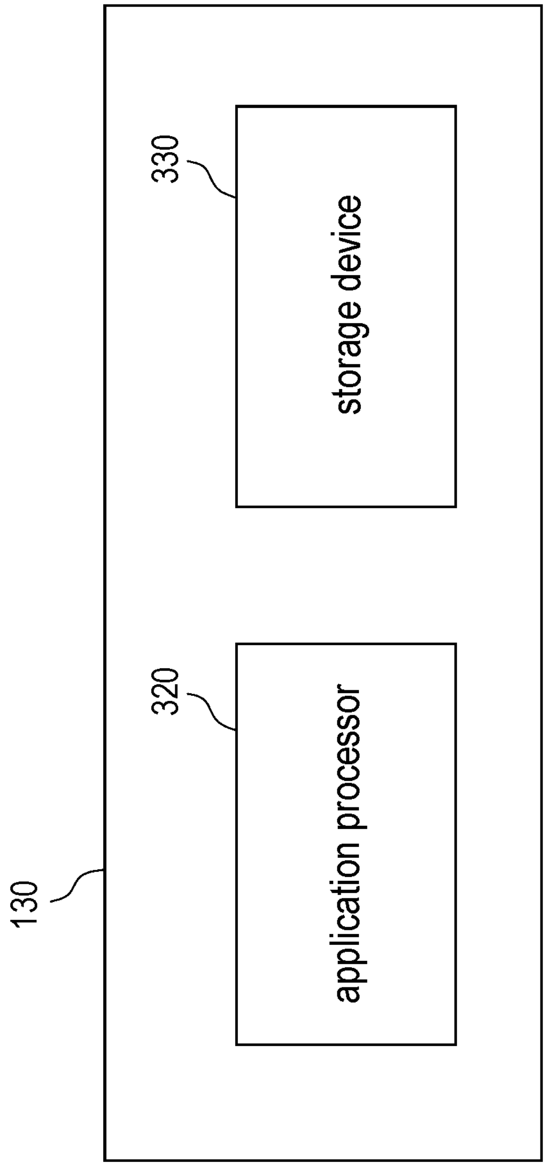
FIG. 11 is a block schematic diagram of internal circuit devices of the electronic device according to the embodiment of FIG. 10.

FIG. 10 is a schematic diagram of an electronic device including a display interface according to an embodiment of the invention. FIG. 11 is a block schematic diagram of internal circuit devices of the electronic device according to the embodiment of FIG. 10. Referring to FIG. 10 and FIG. 11, the electronic device 130 includes a display interface 310. The display interface 310 is, for example, a touch display panel of the electronic device 130. The internal circuit devices of the electronic device 130 include an application processor 320 and a storage device 330. The application processor 320 is configured to execute the application program 340 to cause the display interface 310 to display at least one control pattern.

When the control pattern has not been displayed, the display interface 310 initially displays the application program 340. The application program 340 can cause the application processor 320 to execute the application program 340 through the user's touch gesture, for example, the user clicks on the application program 340. When the application program 340 is opened, the electronic device 130 will automatically detect whether the projection device 110 is present. When the electronic device 130 detects the presence of the projection device 110, the electronic device 130 directly pairs with the projection device 110.

Figure 12:
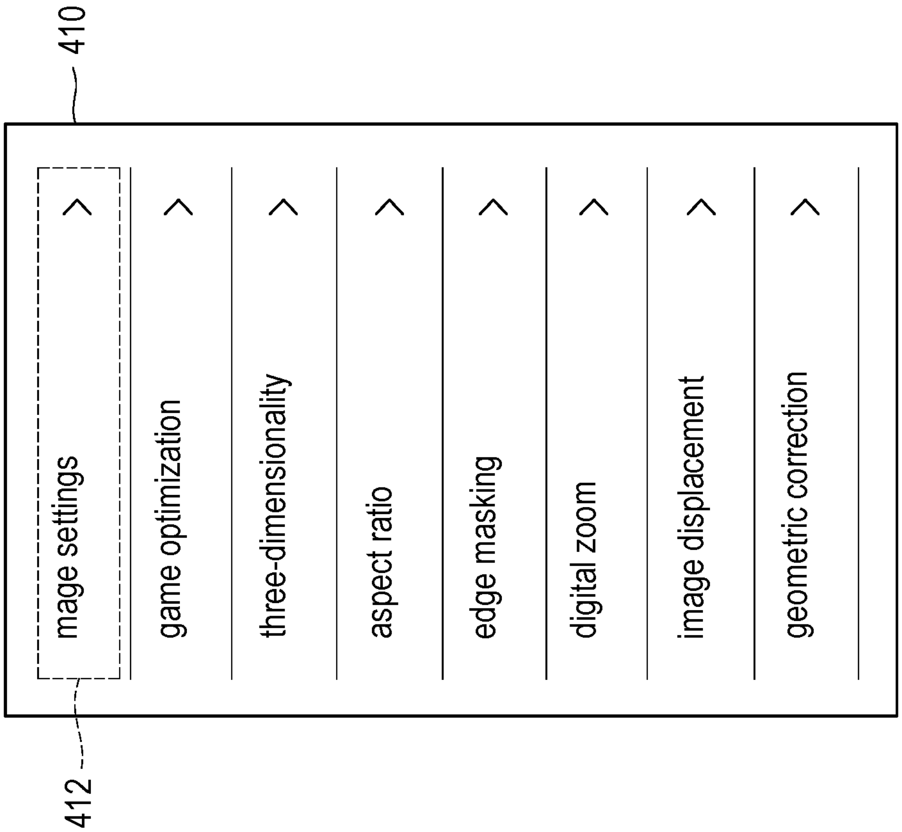
FIG. 12 and FIG. 13 are schematic diagrams of control patterns according to different embodiments of the invention.
Figure 13:
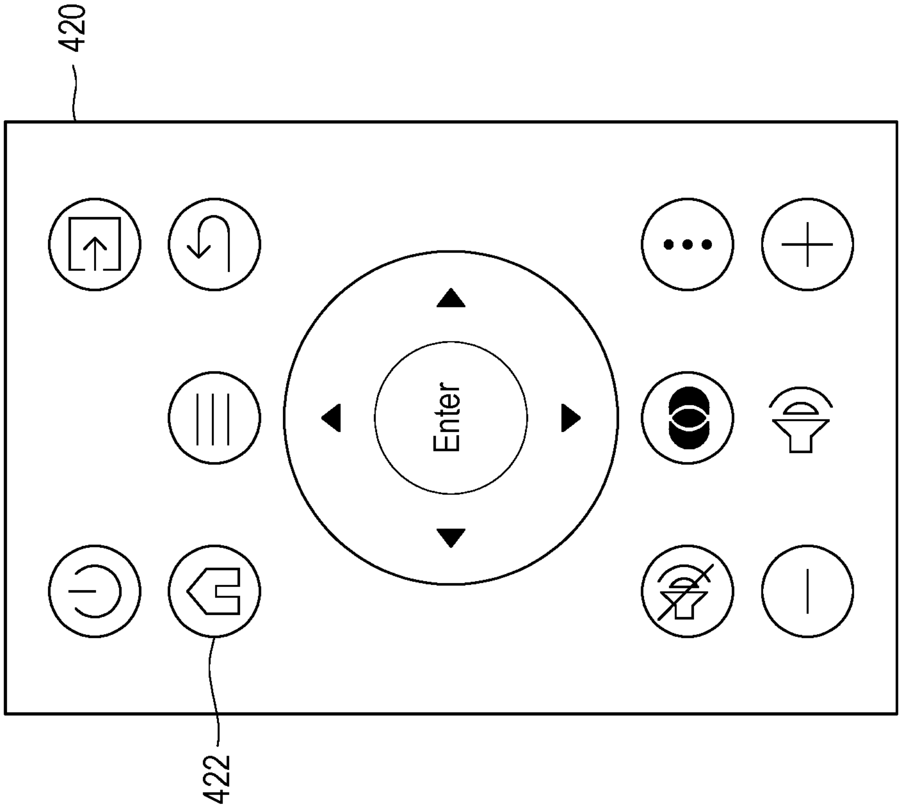

The storage device 330 is configured to store the application program 340, the model information of the projection device 110, and at least one control pattern 410 and 420 of the projection device 110 corresponding to the model information. FIG. 12 and FIG. 13 are schematic diagrams of control patterns according to different embodiments of the invention. Referring to FIG. 12 and FIG. 13, the control pattern includes at least one of the screen display menu 410 of FIG. 12 and the remote control pattern 420 of FIG. 13.

The display interface 310 of the electronic device 130 is adapted to display at least one control pattern. For example, the electronic device 130 can switch the control pattern displayed on the display interface 310 to the screen display menu 410 or the remote control pattern 420 through the application program 340. Specifically, when the display interface 310 displays the screen display menu 410, the user can directly operate the screen display menu 410 on the display interface 310 to enhance the user experience. On the other hand, when the display interface 310 displays the remote control pattern 420, the electronic device 130 can be used as a remote control, replacing the remote control originally equipped with the projection device 110. In other words, the user can control the setting menu displayed on the projection screen by operating the remote control pattern 420.

When the control pattern is triggered, the electronic device 130 generates a control command 140 and transmits it to the adapter device 120. For example, when the display interface 310 displays the screen display menu 410, the screen display menu 410 may include a plurality of items 412. The items 412 are, for example, image settings, game optimization, three-dimensionality, aspect ratio, edge masking, digital zoom, image displacement, geometric correction or a combination thereof, and the invention is not limited thereto. When any item 412 on the screen display menu 410 is triggered, the electronic device 130 will generate a corresponding control command 140 and transmit it to the adapter device 120. On the other hand, when the display interface 310 displays the remote control pattern 420, the remote control pattern 420 may include a plurality of buttons 422, and the patterns or text displayed on the buttons 422 correspond to the remote control originally equipped with the projection device 110. When the button 422 on the remote control pattern 420 is triggered, the electronic device 130 will generate a corresponding control command 140 and transmit it to the adapter device 120. The electronic device 130 can switch the control pattern displayed on the display interface 310 to the screen display menu 410 or the remote control pattern 420 through the application program 340.

Figure 14:
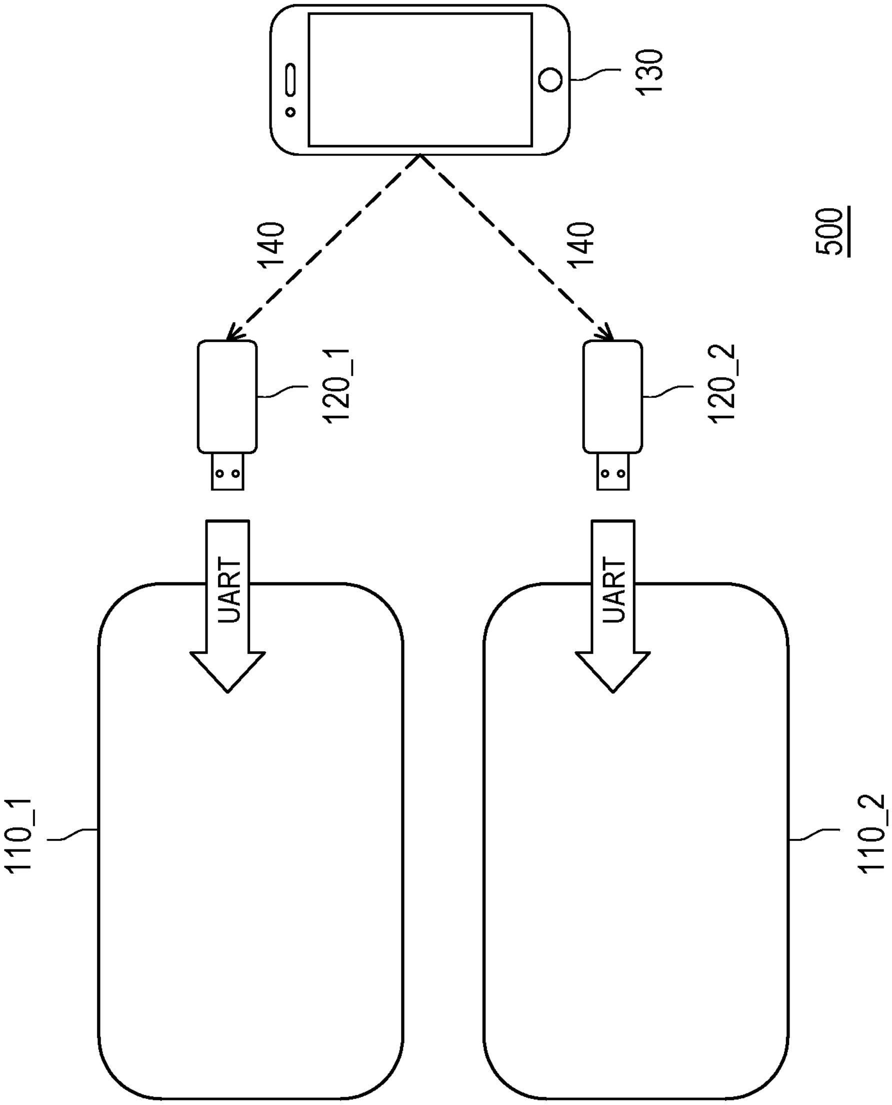
FIG. 14 is a schematic diagram of a projection system according to another embodiment of the invention.

FIG. 14 is a schematic diagram of a projection system according to another embodiment of the invention. Referring to FIG. 14, the projection system 500 includes an electronic device 130, at least two projection devices 110_1 and 110_2 and at least two adapter devices 120_1 and 120_2. The projection devices 110_1 and 110_2 are respectively connected to the adapter devices 120_1 and 120_2. When the electronic device 130 detects the presence of the two projection devices 110_1 and 110_2, the electronic device 130 displays a list to allow the user to select one of the two projection devices 110_1 and 110_2 for pairing.

In the present embodiment, the storage device 330 of the electronic device 130 is further configured to store the model information of the two corresponding projection devices 110_1 and 110_2 and the control pattern corresponding to the model information.

In summary of the foregoing, in the embodiments of the invention, taking a mobile device as an electronic device as an example, the mobile device may be configured to replace an IR remote control. The mobile device may be installed with an application to replace the IR remote controller to remotely control the projector, which may address to the issue that the conventional remote controller is prone to aging, damage, or loss, making it unlikely to remotely control the projector. After using a mobile device to replace the conventional remote controller, it is not necessary to constantly replace the general battery, which may prevent environmental pollution. The mobile device may automatically connect to a Bluetooth dongle of the projector through the application, which may reduce the complicated setting process and optimize the user experience. In addition, the projector may be added with operating functions and other after-sales services through updating the application online. The issue of directivity does not exist when a Bluetooth dongle is used as the approach of transmission.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection system comprising:

an electronic device;

an adapter device connected to the electronic device, and configured to receive a control command output by the electronic device; and a projection device adapted to be connected to the adapter device, and comprising a first control circuit and a second control circuit, wherein the first control circuit is configured to perform a booting operation on the projection device according to the control command in a powered-off state of the projection device, and the second control circuit is configured to perform a power-off operation or a running operation on the projection device according to the control command in a booted-up state of the projection device;

wherein the adapter device is configured to convert a communication protocol of the control command from a first communication protocol into a second communication protocol;

wherein the projection device further comprises:

a first switch circuit connected to the adapter device, and configured to receive the control command conforming to the second communication protocol from the adapter device and output the control command; and a second switch circuit connected between the first switch circuit and the first control circuit and between the first switch circuit and the second control circuit, and configured to receive the control command conforming to the second communication protocol from the first switch circuit and output the control command to the first control circuit or the second control circuit.

2. The projection system according to claim 1, wherein the second switch circuit outputs the control command to the first control circuit in the powered-off state, such that the first control circuit performs the booting operation on the projection device according to the control command.

3. The projection system according to claim 1, wherein the second switch circuit outputs the control command to the second control circuit in the booted-up state, such that the second control circuit performs the power-off operation or the running operation on the projection device according to the control command.

4. The projection system according to claim 1, wherein the first switch circuit comprises a first port and a second port, wherein the first switch circuit is connected to the second control circuit through the first port, and the first switch circuit is connected to a host system through the second port, such that the host system performs an updating operation on the second control circuit.

5. The projection system according to claim 1, wherein the electronic device comprises a display interface, and the display interface is adapted to display at least one control pattern, and when the at least one control pattern is triggered, the electronic device generates the control command and transmits the control command to the adapter device.

6. The projection system according to claim 5, wherein the at least one control pattern comprises one of a screen display menu and a remote control pattern.

7. The projection system according to claim 6, wherein the electronic device displays the screen display menu and the remote control pattern according to model information of the projection device.

8. The projection system according to claim 6, wherein the electronic device comprises an application processor, and the application processor is configured to execute an application program to cause the display interface to display the at least one control pattern.

9. The projection system according to claim 8, wherein the electronic device switches the at least one control pattern displayed by the display interface to the on-screen display menu or the remote control pattern through the application program.

10. The projection system according to claim 8, wherein the electronic device further comprises a storage device, and the storage device is configured to store the application program.

11. The projection system according to claim 10, wherein the storage device is further configured to store model information of the projection device and the at least one control pattern of the projection device corresponding to the model information.

12. The projection system according to claim 11, wherein when the application program is opened, the electronic device automatically detects whether the projection device is present.

13. The projection system according to claim 12, wherein when the electronic device detects the presence of the projection device, the electronic device is directly paired with the projection device.

14. The projection system according to claim 12, wherein there are at least two projection devices and at least two adapter devices, the at least two projection devices are respectively connected to the at least two adapter devices, and when the electronic device detects the presence of the at least two projection devices, the electronic device displays a list to allow the user to select one of the at least two projection devices for pairing.

15. The projection system according to claim 14, wherein there is a model information corresponding to each of the at least two projection devices, the storage device is further configured to store the model information corresponding to each of the at least two projection devices and the at least two control patterns, wherein each of the at least two control patterns respectively corresponds to a different one of the at least two model information.

16. A projection system comprising:

an electronic device;

an adapter device connected to the electronic device, and configured to receive a control command output by the electronic device; and a projection device adapted to be connected to the adapter device, and comprising a first control circuit and a second control circuit, wherein the first control circuit is configured to perform a booting operation on the projection device according to the control command in a powered-off state of the projection device, and the second control circuit is configured to perform a power-off operation or a running operation on the projection device according to the control command in a booted-up state of the projection device;

wherein the adapter device is configured to convert a communication protocol of the control command from a first communication protocol into a second communication protocol;

wherein the projection device further comprises:

a first switch circuit connected to the adapter device, and configured to receive the control command conforming to the second communication protocol from the adapter device and output the control command;

a third control circuit connected to the first switch circuit, and configured to receive the control command conforming to the second communication protocol from the first switch circuit and convert the control command conforming to the second communication protocol into a control signal conforming to a third communication protocol; and a fourth control circuit connected between the third control circuit and the first control circuit and between the third control circuit and the second control circuit, and configured to receive the control signal conforming to the third communication protocol from the third control circuit and output the control signal to the first control circuit or the second control circuit.

17. The projection system according to claim 16, wherein the fourth control circuit outputs the control signal to the first control circuit in the powered-off state, such that the first control circuit performs the booting operation on the projection device according to the control signal.

18. The projection system according to claim 16, wherein the fourth control circuit outputs the control signal to the second control circuit in the booted-up state, such that the second control circuit performs the power-off operation or the running operation on the projection device according to the control signal.

19. An operation method of a projection system, wherein the projection system comprises a projection device, an adapter device, and an electronic device, the projection device comprises a first control circuit and a second control circuit, and the operation method comprises:

by the adapter device, receiving a control command output by the electronic device, converting a communication protocol of the control command from a first communication protocol into a second communication protocol, and transmitting the control command to the corresponding projection device;

performing a booting operation on the projection device by the first control circuit according to the control command in a powered-off state; and performing a power-off operation or a running operation on the projection device by the second control circuit according to the control command in a booted-up state;

wherein the projection device further comprises a first switch circuit and a second switch circuit, and the operation method further comprises:

by the first switch circuit, receiving the control command conforming to the second communication protocol from the adapter device and outputting the control command;

by the second switch circuit, receiving the control command conforming to the second communication protocol from the first switch circuit and outputting the control command to the first control circuit or the second control circuit.

20. The operation method according to claim 19, wherein the control command is output by the second switch circuit to the first control circuit in the powered-off state, such that the first control circuit performs the booting operation on the projection device according to the control command.

21. The operation method according to claim 19, wherein the control command is output by the second switch circuit to the second control circuit in the booted-up state, such that the second control circuit performs the power-off operation or the running operation on the projection device according to the control command.

22. The operation method according to claim 19, wherein the first switch circuit comprises a first port and a second port, and the operation method further comprises:

connecting the first switch circuit to the second control circuit through the first port;

connecting the first switch circuit to a host system through the second port; and making the host system perform an updating operation on the second control circuit by the first switch circuit.

23. The operation method according to claim 19, wherein the electronic device comprises a display interface, the display interface is adapted to display at least one control pattern, and the operating method further comprises:

when the at least one control pattern is triggered, generating the control instruction by the electronic device and transmitting the control instruction to the adapter device.

24. The operation method according to claim 23, wherein the at least one control pattern comprises one of a screen display menu and a remote control pattern.

25. The operation method according to claim 24, wherein the electronic device displays the screen display menu and the remote control pattern according to model information of the projection device.

26. The operation method according to claim 24, wherein the electronic device comprises an application processor, and the operating method further comprises:

executing an application program by the application processor to cause the display interface to display the at least one control pattern.

27. The operation method according to claim 26, wherein the electronic device switches the at least one control pattern displayed by the display interface to the on-screen display menu or the remote control pattern through the application program.

28. The operation method according to claim 26, wherein the electronic device further comprises a storage device, and the operating method further comprises:

storing the application program by the storage device.

29. The operation method according to claim 28, wherein the storage device is further configured to store model information of the projection device and the at least one control pattern of the projection device corresponding to the model information.

30. The operation method according to claim 29 further comprising:

when the application program is opened, automatically detecting whether the projection device is present by the electronic device.

31. The operation method according to claim 30 further comprising:

when the electronic device detects the presence of the projection device, directly pairing the electronic device with the projection device.

32. The operation method according to claim 30, wherein the projection system comprises at least two projection devices and at least two adapter devices, and the at least two projection devices are respectively connected to the at least two adapter devices, and the operating method further comprises:

when the electronic device detects the presence of the at least two projection devices, the electronic device displays a list to allow the user to select one of the at least two projection devices for pairing.

33. The operation method according to claim 32, the storage device is further configured to store the at least two model information corresponding to the at least two projection devices and the at least two at least one control patterns corresponding to the at least two model information.

34. An operation method of a projection system, wherein the projection system comprises a projection device, an adapter device and an electronic device, the projection device comprises a first control circuit and a second control circuit, and the operation method comprises:

by the adapter device, receiving a control command output by the electronic device, converting a communication protocol of the control command from a first communication protocol into a second communication protocol, and transmitting the control command to the corresponding projection device;

performing a booting operation on the projection device by the first control circuit according to the control command in a powered-off state; and performing a power-off operation or a running operation on the projection device by the second control circuit according to the control command in a booted-up state;

wherein the projection device further comprises a first switch circuit, a third control circuit and a fourth control circuit, and the operation method further comprises:

by the first switch circuit, receiving the control command conforming to the second communication protocol from the adapter device and outputting the control command;

by the third control circuit, receiving the control command conforming to the second communication protocol from the first switch circuit and converting the control command conforming to the second communication protocol into a control signal conforming to a third communication protocol; and by the fourth control circuit, receiving the control signal conforming to the third communication protocol from the third control circuit and outputting the control signal to the first control circuit or the second control circuit.

35. The operation method according to claim 34, wherein the control signal is output by the fourth control circuit to the first control circuit in the powered-off state, such that the first control circuit performs the booting operation on the projection device according to the control signal.

36. The operation method according to claim 34, wherein the control signal is output by the fourth control circuit to the second control circuit in the booted-up state, such that the second control circuit performs the power-off operation or the running operation on the projection device according to the control signal.

* * * * *